US012525712B2

(12) United States Patent
Carpenter et al.

(10) Patent No.: US 12,525,712 B2
(45) Date of Patent: Jan. 13, 2026

(54) ANTENNA GOOSENECK DEVICE AND COMMUNICATION SYSTEM TO MITIGATE NEAR-FIELD EFFECTS OF CO-LOCALIZED ANTENNAS ON PORTABLE RADIO PRODUCTS AND METHODS OF USE THEREOF

(71) Applicant: Thales Defense & Security, Inc., Clarksburg, MD (US)

(72) Inventors: Brett Carpenter, Frederick, MD (US); Dena Horstkotte, Frederick, MD (US); Steve Kutchi, Ijamsville, MD (US)

(73) Assignee: Thales Defense & Security, Inc., Clarksburg, MD (US)

( * ) Notice: Subject to any disclaimer, the term of this patent is extended or adjusted under 35 U.S.C. 154(b) by 0 days.

(21) Appl. No.: 18/738,575

(22) Filed: Jun. 10, 2024

(65) Prior Publication Data

US 2024/0332790 A1 Oct. 3, 2024

Related U.S. Application Data

(62) Division of application No. 17/854,950, filed on Jun. 30, 2022, now Pat. No. 12,021,301.

(Continued)

(51) Int. Cl.
*H01Q 1/52* (2006.01)
*H01Q 1/08* (2006.01)

(52) U.S. Cl.
CPC ............. *H01Q 1/521* (2013.01); *H01Q 1/085* (2013.01); *H01Q 1/088* (2013.01)

(58) Field of Classification Search
None
See application file for complete search history.

(56) References Cited

U.S. PATENT DOCUMENTS 3,680,146 A * 7/1972 Leitner .................. H01Q 1/528 343/885
4,496,953 A * 1/1985 Spinks, Jr. ............... H01Q 9/16 343/822

(Continued)

FOREIGN PATENT DOCUMENTS

CN 204991926 U * 1/2016
EP 0895257 A1 * 2/1999

OTHER PUBLICATIONS

"MPU5 Basic Operator Manual", Persistent Systems, LLC , p. 23 (Year: 2020).*

(Continued)

*Primary Examiner* — Dameon E Levi
*Assistant Examiner* — Anh N Ho
(74) *Attorney, Agent, or Firm* — ArentFox Schiff LLP

(57) ABSTRACT

A communication system comprising a radio device and a gooseneck device. The radio device may be coupled to a first antenna and a second antenna. A feedline gooseneck device may be coupled to the first antenna. The feedline gooseneck device may include a coaxial cable coupled between the mobile device and the first antenna and a ferrite element positioned along the coaxial cable. The ferrite element is configured to reduce EM interaction between the first and the second antenna. The ferrite element may be one of a plurality of ferrite elements and the feedline gooseneck device may further include a plurality of flexible elements positioned adjacent to each of the plurality of ferrite elements. The system allows for reduction of an amount of electromagnetic interference between the first antenna coupled to the gooseneck and the second antenna.

20 Claims, 7 Drawing Sheets

Related U.S. Application Data

(60) Provisional application No. 63/219,570, filed on Jul. 8, 2021.

(56) References Cited

U.S. PATENT DOCUMENTS

| | | | | |
|---|---|---|---|---|
| 5,343,213 | A * | 8/1994 | Kottke | H01Q 1/244 343/702 |
| 2012/0194401 | A1 | 8/2012 | Mclean et al. | |
| 2013/0009832 | A1 | 1/2013 | Apostolos et al. | |
| 2015/0244075 | A1* | 8/2015 | Platt | H01Q 1/38 343/792 |
| 2020/0185817 | A1* | 6/2020 | Mui | H01Q 9/32 |
| 2021/0143547 | A1* | 5/2021 | Owens | H01Q 1/04 |

OTHER PUBLICATIONS

Qin et al, "VHF/UHF Miniaturized Ferrite-EBG Composited Choke Structures", Mar. 2021, IEEE Access, vol. 9, pp. 50025-50034 (Year: 2021).*
"MPU5 Basic Operator Manual", Persistent Systems, LLC (Year: 2020).

* cited by examiner

ANTENNA GOOSENECK DEVICE AND COMMUNICATION SYSTEM TO MITIGATE NEAR-FIELD EFFECTS OF CO-LOCALIZED ANTENNAS ON PORTABLE RADIO PRODUCTS AND METHODS OF USE THEREOF

CROSS-REFERENCE TO RELATED APPLICATIONS

This application is a divisional of U.S. patent application Ser. No. 17/854,950, filed Jun. 30, 2022, which claims the benefit of U.S. Provisional Application No. 63/219,570, filed Jul. 8, 2021, and hereby incorporates by reference herein the contents of these applications.

TECHNICAL FIELD

Aspects of the present disclosure are directed to gooseneck communication systems and devices for application in wireless communication devices, and methods of use thereof.

BACKGROUND

This background and summary are provided to introduce a selection of concepts in a simplified form that are further described below in the DETAILED DESCRIPTION. This background and summary are not intended to identify key features of the claimed subject matter, nor are they intended to be used as an aid in determining the scope of the claimed subject matter.

Developed in the late $19^{th}$ and early $20^{th}$ centuries, wireless radios revolutionized communication among people over distances by facilitating the wireless transmission of information, messages, and other related data over electromagnetic waves, for example, within radio frequencies between 30 hertz (Hz) and 300 gigahertz (GHz). Since the radio was introduced to the battlefield in World War I, radio technology has become increasingly more reliable, compact, and robust, and thus continued to enhance human capacity for communication and coordination both in times of war and in times of peace.

Long removed from the early prototypes that required horses and mules for transport, the modern radio is now sufficiently compact for hand-held use. Consequent of such a condensed configuration, the modern radio necessarily incorporates a plurality of components into a small physical space. Such components historically have included transmitters configured to transmit a modulated radio signal, receivers configured to receive modulated radio signals from another transmitting radio device, and batteries, power adapters, or similar power sources attached to the radio device, such that the radio may be powered when in mobile use.

As radio technology has developed and become more specialized, it can be necessary for users to carry multiple radios that can send and receive signals on different signal frequencies. Carrying multiple radios can be difficult, as they add weight to a user's load since each radio incudes its own battery, power supply etc. Multi-channel radio systems were developed to address this problem. Multi-channel radios may include multiple radios systems capable of operating independently (e.g., sending and transmit signals independently of other radio systems in the multi-channel radio system) in a single housing. Each of the radio systems includes its own transmitting and receiving system, but shares common elements such as power supplies, batteries, and so forth with the other radio systems in the multi-channel radio device. Thus multi-channel radio devices may include multiple antennas positioned in close proximity to each other.

Multi-channel radio devices typically have multiple antennas in close proximity to each other on the top of the radio device. The electromagnetic (EM) signals sent and/or received by these multiple antennas in close proximity to each other may cause EM interaction, resulting in a reduction in performance of these antennas. Gooseneck devices, which are typically made of flexible metal tubes, may be used to mitigate interference between antennas in close proximity by elevating one of the antennas above other nearby antennas. However, the metal in the gooseneck device may negatively affect the EM propagation performance of nearby antennas.

Thus, there remains an unmet need in the related art for a portable radio device that incorporates an effective method of preventing closely located antennas from negatively impacting the EM performance of nearby antennas.

In addition, there remains an unmet need for a radio device that incorporates a gooseneck device that prevents nearby antennas from negatively impacting the EM antennas of each other and also does not negatively impact the EM performance of nearby antennas.

Additional advantages and novel features of these aspects will be set forth in part in the description that follows, and in part will become more apparent to those skilled in the art upon examination of the following or upon learning by practice of the disclosure.

SUMMARY

In view of the above problems and shortcomings, as well as others, aspects of the present disclosure relate to, among other features, portable wireless devices incorporating gooseneck devices, and methods of use thereof. According to various aspects, a mobile device incorporating the gooseneck device in accordance with aspects of the present disclosure may comprise a communication system including the mobile device and the gooseneck device. The mobile device may be configured to be coupled to a plurality of antennas. The gooseneck device may be coupled to one of the plurality of antennas. The gooseneck device may include a coaxial cable coupled between the mobile device and the one of the plurality of antennas, a plurality of ferrite elements positioned along the coaxial cable; and a plurality of flexible elements positioned adjacent to each of the plurality of ferrite elements. The plurality of ferrite elements may be configured to reduce electromagnetic (EM) interference among the plurality of antennas. The plurality of ferrite elements may surround at least 70% of a length of the coaxial cable. The plurality of flexible elements may include at least one of a non-metallic material, a non-conductive material, and a compliant material, or a combination thereof. The first antenna may include a global positioning systems antenna. The first antenna may be removably coupled to the gooseneck device.

In some aspects, a gooseneck device for a communication system may comprise a first port configured to engage a mobile device, a second port configured to engage at least one antenna from a plurality of antennas, a coaxial cable coupled between the first port and the second port, a plurality of ferrite elements positioned along the coaxial cable, and a plurality of flexible elements positioned adjacent to each of the plurality of ferrite elements. The plurality of ferrite elements may be configured to reduce electromagnetic (EM) interference among the plurality of antennas. The plurality of ferrite elements may surround at least 70% of a length of the coaxial cable. The plurality of flexible elements may include at least one of a non-metallic, a non-conductive, and a compliant material. The antenna may be integrally formed with the second port.

BRIEF DESCRIPTION OF THE DRAWINGS

The novel features believed to be characteristic of implementations of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further features and advances thereof, will be best understood by reference to the following detailed description of illustrative implementations of the disclosure when read in conjunction with the accompanying drawings, wherein:

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A "radio device," as used herein, may be any form of a wireless device operating on radio signals, for example, a mobile device, a mobile telephone, a radio, a personal digital assistant ("PDA"), and may not be limited to a specific radio device.

Aspects of the present disclosure relate to methods and systems for preventing nearby antennas from negatively impacting the electromagnetic ("EM") performance of nearby antennas. These methods, apparatuses, and media will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

Figure 7:
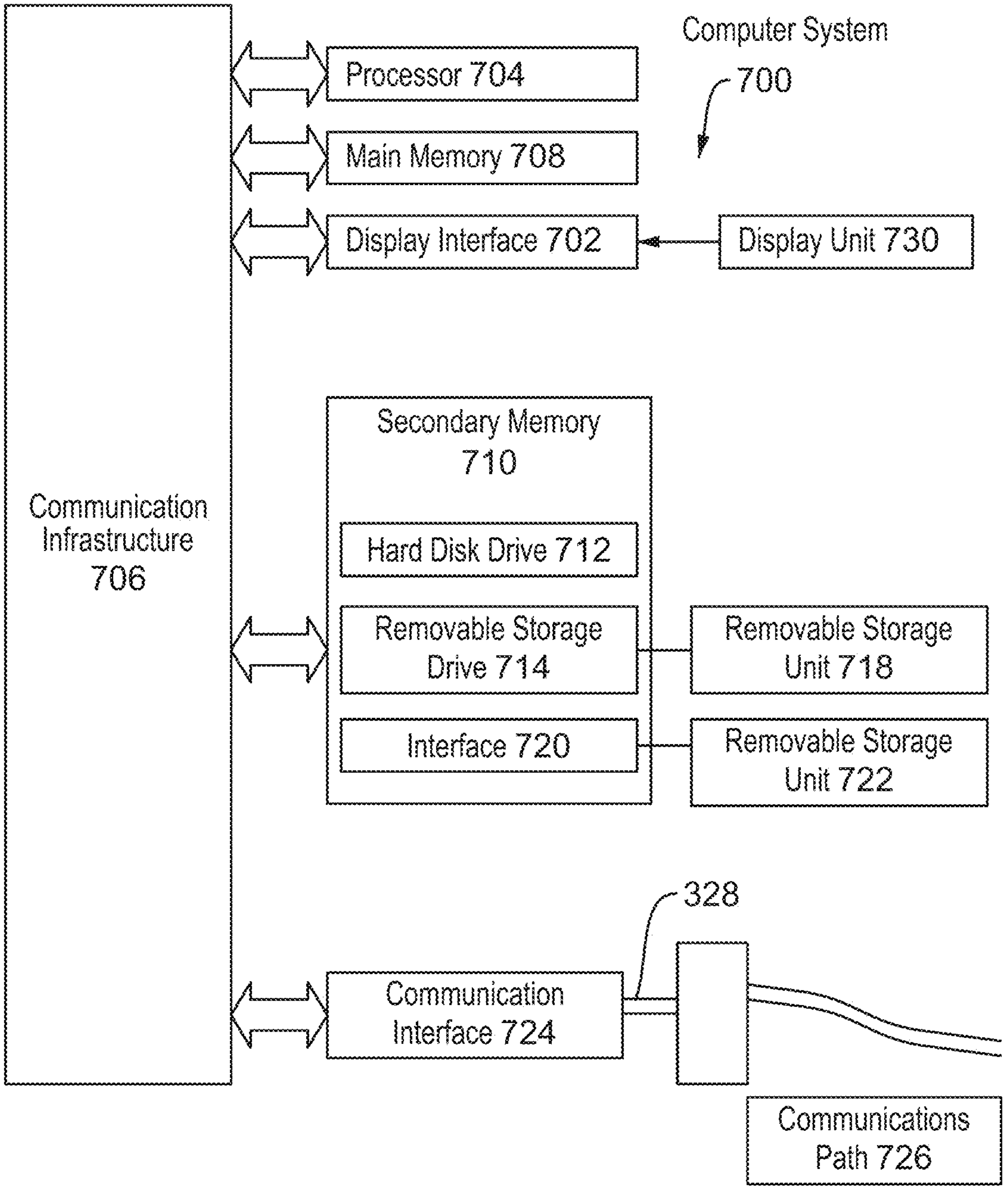
FIG. 7 illustrates an example system diagram of various hardware components and other features, for use in accordance with aspects of the present disclosure.

By way of example, an element, or any portion of an element, or any combination of elements may be implemented with a 'processing system' that includes one or more processors, such as the one shown in FIG. 7. Examples of processors include microprocessors, microcontrollers, digital signal processors (DSPs), field programmable gate arrays (FPGAs), programmable logic devices (PLDs), state machines, gated logic, discrete hardware circuits, discrete radio frequency (RF) circuits, and other suitable hardware configured to perform the various functionality described throughout this disclosure. One or more processors in the processing system may execute software. Software shall be construed broadly herein to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects of the present disclosure, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, digital versatile disc (DVD), and floppy disk, where disks usually reproduce data magnetically, while discs reproduce data optically with lasers. Combinations of the above should also be included within the scope of computer-readable media.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 1:
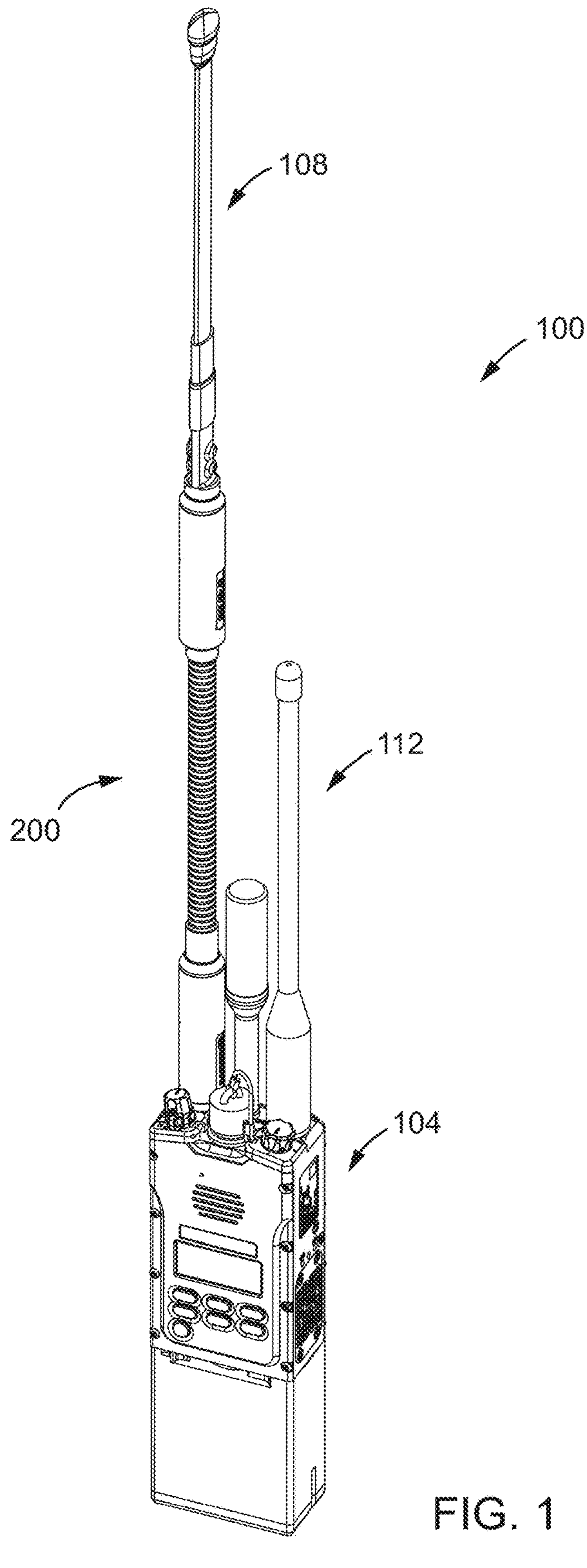
FIG. 1 illustrates a perspective view of an assembled communication device employing an example gooseneck device coupled to an antenna, according to aspects of the present disclosure.

FIG. 1 illustrates a communication system 100, including a communication device, such as a radio device 104, a first antenna 108, a second antenna 112, and a feedline gooseneck device 200, in accordance with aspects of the present disclosure. The gooseneck device 200 may be a semi-rigid feedline structure that allows the user to mechanically position antennas coupled to the gooseneck device 200 so that the position of the antenna does not impact the user's duties.

The radio device 104 may include various components for receiving, processing, and transmitting a radio frequency (RF) signal, such as a radio frequency amplifier, mixer, variable frequency oscillator, intermediate frequency amplifier, detector, and/or audio amplifier (e.g., the hand-held radio JEM, made by Thales Communications, Inc., of Clarksburg, MD). In an alternate example, radio device 104 may include various components for receiving and transmitting communication signals using radio technologies, such as, Very High Frequency (VHF), Ultra High Frequency (UHF), L-Band, a legacy military waveform, a narrowband voice channel, or a global positioning systems (GPS) signals. In some examples, the first antenna 108 may be a GPS antenna. The radio device 104 may include multiple different antennas configured to receive or transmit different RF signals and/or signals utilizing different radio technologies, such as the first antenna 108 and the second antenna 112, in close proximity. Although the radio device 104 is described herein as having two antennas 108, 112, in other implementations, the radio device 104 may have more antennas.

In FIG. 1, the radio device 104 is shown in an example configuration wherein the radio device 104 may interoperate with the gooseneck device 200, the first antenna 108, and the second antenna 112. As is described in greater detail with respect to FIGS. 2-4 below, the gooseneck device 200 interoperates with the first antenna 108 and the radio device 104. The gooseneck device 200 may be configured to isolate the first antenna 108 from the second antenna 112. In one example, the interoperation between the radio device 104 and the gooseneck device 200 may be facilitated by the interaction of a threaded fasteners, such as a screw or rivet (not shown in FIG. 1) and a corresponding mounting feature, such as a threaded opening (not shown in FIG. 1). In one variation, the threaded connector may be configured to be incorporated with the gooseneck device 200 (e.g., at a first port 204), such that the gooseneck device 200 may connect to the mounting feature incorporated into the radio device 104. However, in an alternative example, the threaded connector may be incorporated into the radio device 104, wherein the connector may interoperate with the mounting feature incorporated in the gooseneck device 200 (e.g., at the first port 204).

In yet another example implementation, a threaded connector-mounting feature need not be implemented. For example, the radio device 104 may be fastenably interoperable with the gooseneck device 200 via a system of snap engaging features or other similar securing members. The system of snap engaging features may include a plurality of snap receiving features mounted to the radio device 104, and a corresponding plurality of snap engaging features positioned within gooseneck device 200 (e.g., at the first port 204), such that when the snap engaging features are aligned with and then pressed against the snap receiving features, the snap engaging features may fastenably engage with the snap receiving features. Consequently, the radio device 104 may be secured to and interoperable with the gooseneck device 200. Further, in another example, the radio device 104 may be configured to include the snap engaging features and gooseneck device 200 (e.g., at the first port 204) may include the snap receiving features. In yet another example, either the gooseneck device 200 or the radio device 104 may be configured to include a twist-lock, wherein the twist lock may be matably engageable with the device, which is not configured with the twist-lock.

It will be recognized by those of ordinary skill in that art that any other means for achieving interoperation between the radio device 104 and the gooseneck device 200, beyond those described above, fall within the scope of the present disclosure.

Figure 2:
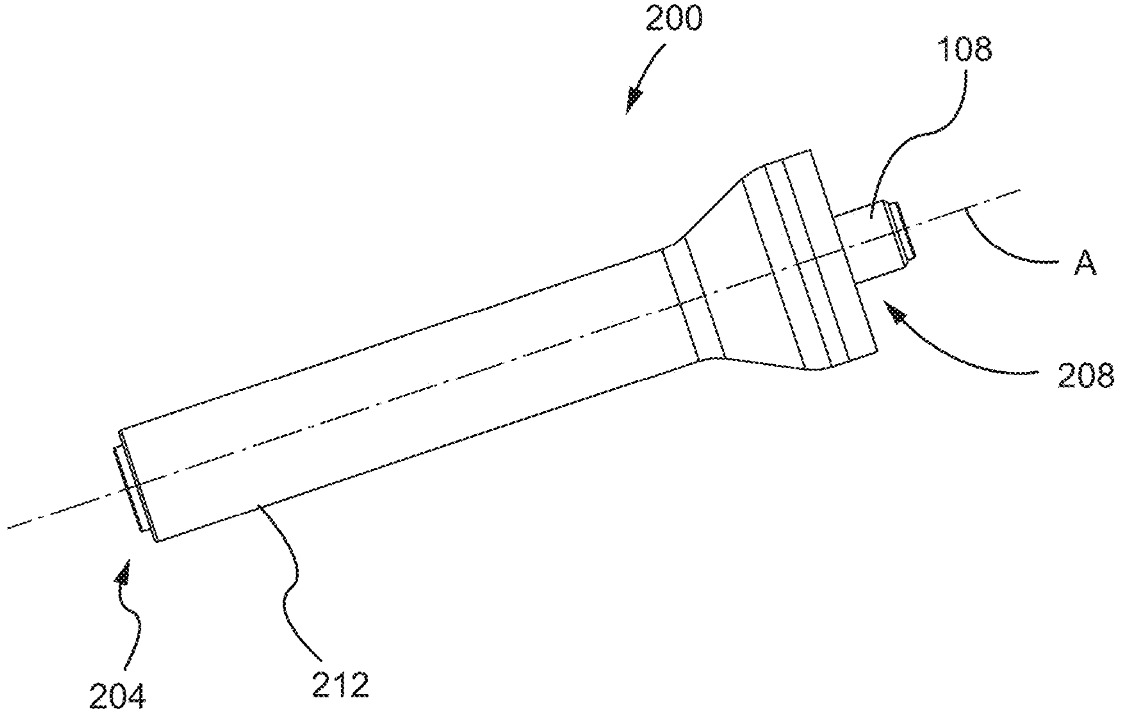
FIG. 2 illustrates a perspective view of an example gooseneck device for the assembled device of FIG. 1, according to aspects of the present disclosure.

Referring again to FIG. 1, and in conjunction with FIG. 2, the interoperation between the gooseneck device 200 and the first antenna 108 may be facilitated by the interaction of a threaded fasteners, such as a screw or rivet (not shown in FIG. 1) and a corresponding mounting feature, such as a threaded opening (not shown in FIG. 1). In one variation, the threaded connector may be configured to be incorporated with the gooseneck device 200 (e.g., at a second port 208), such that the gooseneck device 200 may connect to the mounting feature incorporated into the first antenna 108. However, in an alternative example, the threaded connector may be incorporated into the antenna 108, wherein connector may interoperate with the mounting feature incorporated in the gooseneck device 200 (e.g., at the second port 208).

In yet another example implementation, a threaded connector-mounting feature need not be implemented. For example, the first antenna 108 may be fastenably interoperable with the gooseneck device 200 (e.g., at the second port 208) via a system of snap engaging features or other similar securing members. The system of snap engaging features may include a plurality of snap receiving features mounted to the first antenna 108, and a corresponding plurality of snap engaging features positioned within gooseneck device 200 (e.g., at the second port 208), such that when the snap engaging features are aligned with and then pressed against the snap receiving features, the snap engaging features may fastenably engage with the snap receiving features. Consequently, the first antenna 108 may be secured to and interoperable with the gooseneck device 200 (e.g., at the second port 208). Further, in another example, the first antenna 108 may be configured to include the snap engaging features and the gooseneck device 200 (e.g., at the second port 208) may include the snap receiving features. In yet another example, either the gooseneck device 200 or the first antenna 108 may be configured to include a twist-lock, wherein the twist lock may be matably engageable with the device, which is not configured with the twist-lock.

In yet another example implementation, the gooseneck device 200 and the first antenna 108 may be integrally formed. In such an implementation, the gooseneck device 200 and the first antenna 108 may be permanently connected.

In yet another example implementation, the gooseneck device 200 and the antenna 108 may be permanently connected to the radio device 104.

It will be recognized by those of ordinary skill in that art that any other means for achieving interoperation between gooseneck device 200 and the first antenna 108, beyond those described above, fall within the scope of the present disclosure.

As described above, the radio device 104 may include multiple different antennas, such as the first antenna 108 and the second antenna 112, configured to receive or transmit different electromagnetic (EM) signals and/or signals utilizing different radio technologies in close proximity. In operation, in one aspect of the present disclosure, the gooseneck device 200 includes ferrite elements 220 that isolate the EM signals received and/or transmitted by the first antenna 108 from other EM signals in the area, such as those received and/or transmitted by the second antenna 112. Therefore, the gooseneck device 200 reduces an amount of EM interaction between the first antenna 108 and the second antenna 112.

FIG. 2, according to aspects of the present disclosure, illustrates a perspective view of an example gooseneck device 200 in accordance with aspects of the present disclosure. The gooseneck device 200 may be selectively connectable to the radio device 104 and the first antenna 108. The gooseneck device 200 may include a first port 204 configured to engage the radio device 104 at a first end of the gooseneck device 200 and a second port 208 configured to engage the first antenna 108 at a second end of the gooseneck device 200. As illustrated in FIG. 2, an overmolded material 212 may cover a surface of the gooseneck device 200. The overmolded material 212 may be a water-impermeable, non-metallic material. The overmolded material 212 may be configured to provide a water-and-dust-tight seal around the surface of the gooseneck device 200. The overmolded material 212 may cover at least a portion of the ferrite elements 220, the co-axial cable 216 and/or the flexible elements 224.

Figure 3:
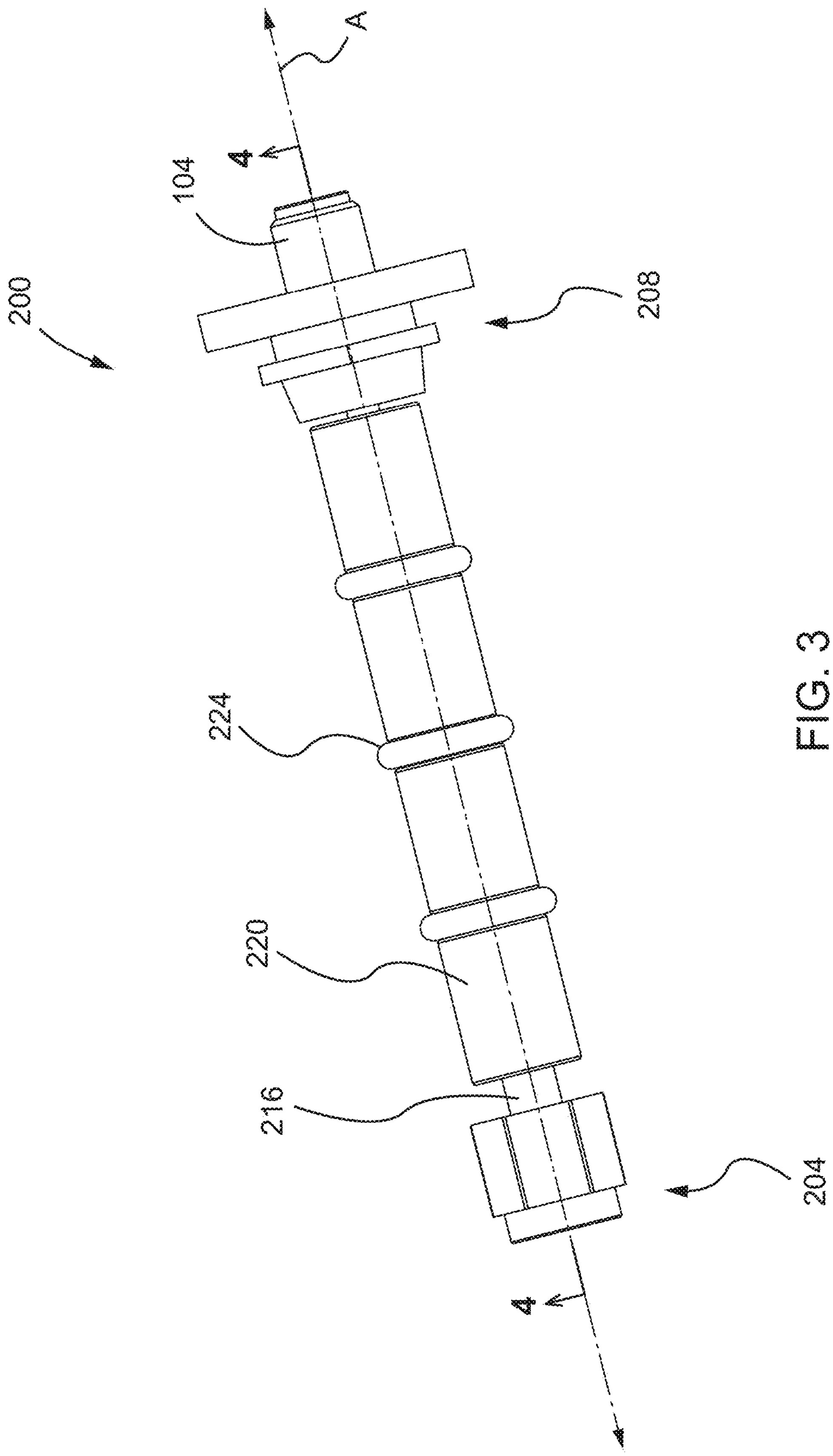
FIG. 3 illustrates a perspective view of the example gooseneck device of for the assembled device of FIG. 1, according to aspects of the present disclosure.
Figure 4:
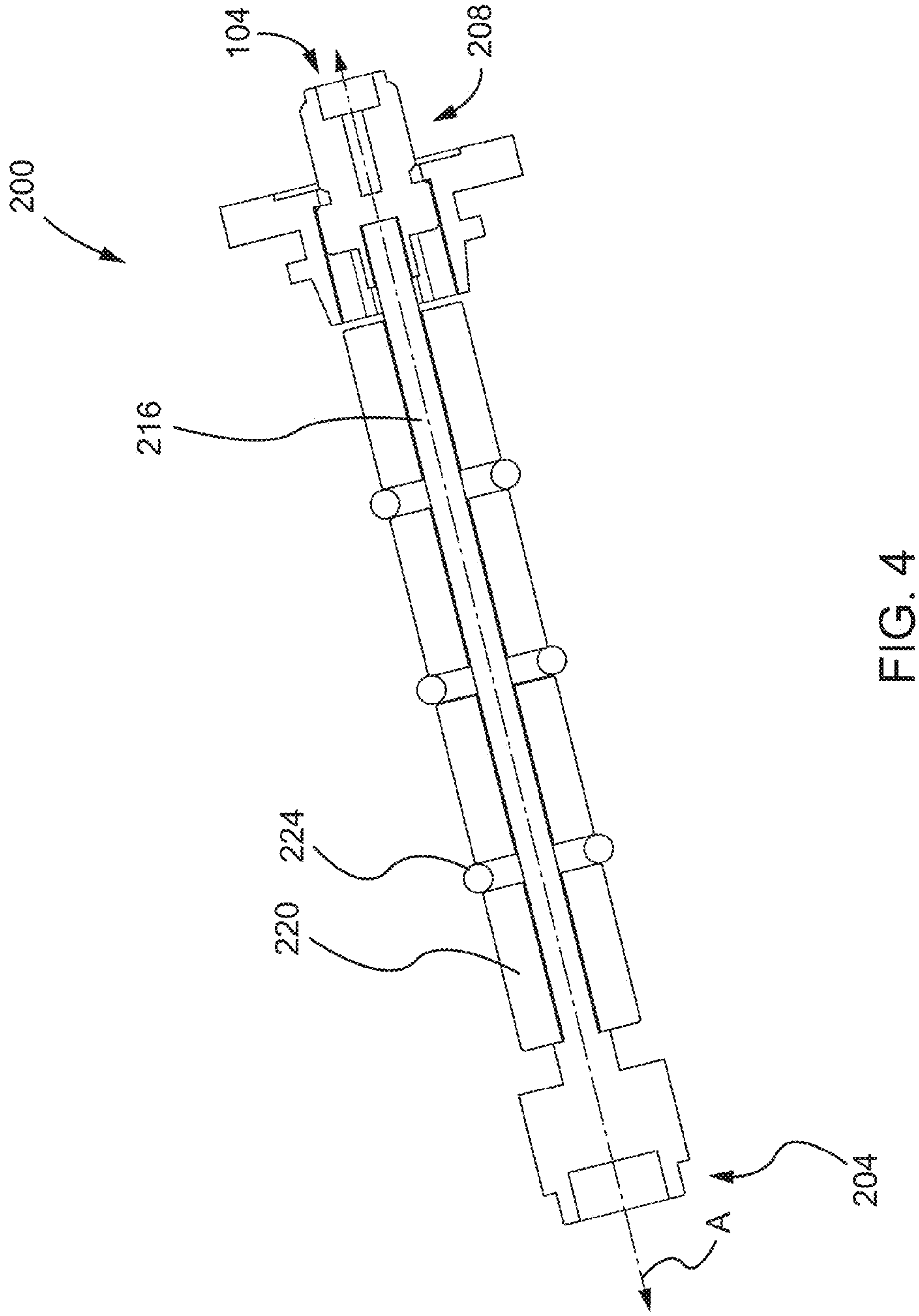
FIG. 4 illustrates a cross-sectional view of the example gooseneck device of FIG. 3 taken along lines 4-4 of FIG. 3, according to aspects of the present disclosure.

FIG. 3 illustrates a perspective view of the example gooseneck device 200, in which the overmolded material 212 is not shown. FIG. 4 illustrates a cross-sectional view taken along lines 4-4 of FIG. 3. As illustrated in FIGS. 3 and 4, the gooseneck device 200 may include a feedline, such as coaxial cable 216, a plurality of ferrite elements 220, and a plurality of flexible elements 224.

The coaxial cable 216 may be coupled between the first port 204 and the second port 208 of the gooseneck device 200 and may extend along a longitudinal axis A of the gooseneck device 200. The coaxial cable 216 may include a metal shield (not illustrated). The coaxial cable 216 may be coupled to the radio device 104 (e.g., via the first port 204) and the first antenna 108 (e.g., via the second port 208) to allow electrical signals to be sent and/or received between the radio device 104 and the first antenna 108.

The ferrite elements 220 may be positioned along the coaxial cable 216 along the axis A. Each of the ferrite elements 220 may surround a portion of the coaxial cable 216 so that the coaxial cable 216 may extend through the ferrite elements 220. In the example illustrated in FIGS. 3-4, the gooseneck device 200 may include four ferrite elements 220. In other aspects of the disclosure, the gooseneck device 200 may include more or fewer ferrite elements 220. The ferrite elements 220 shown in FIGS. 3-4 may be tubular. In other aspects of the disclosure, the ferrite elements may have different shapes, for example, ovals or squares, among other shapes. The ferrite elements 220 may be rigid elements that provide stiffness to the gooseneck device 200. In some aspects of the disclosure, the ferrite elements 220 may cover or surround at least 60% of the length of the coaxial cable 216 along the axis A. In some aspects of the disclosure, the ferrite elements 220 may cover or surround at least 70% of the length of the coaxial cable 216 along the axis A. In some aspects of the disclosure, the ferrite elements 220 may cover or surround at least 75% of the length of the coaxial cable 216 along the axis A. In some aspects of the disclosure, the ferrite elements 220 may cover or surround at least 80% of the length of the coaxial cable 216 along the axis A. In some aspects of the disclosure, the ferrite elements 220 may cover or surround at least 85% of the length of the coaxial cable 216 along the axis A. In some aspects of the disclosure, the ferrite elements 220 may cover or surround at least 90% of the length of the coaxial cable 216 along the axis A. In some aspects of the disclosure, the ferrite elements 220 may cover or surround at least 95% of the length of the coaxial cable 216 along the axis A.

Each of the ferrite elements 220 may isolate a portion of the coaxial cable 216 by allowing EM signals to travel in the direction indicated by the axis A and preventing EM signals from entering or leaving the coaxial cable 216 in other directions. The ferrite elements 220 may reduce an amount of EM interaction by nearby antennas, such as the first antenna 108 and the second antenna 112. For example, the gooseneck device 200 may vertically space the first antenna 108 and the second antenna 112. The ferrite elements 220 may allow signals to travel between the first antenna 108 and the radio device 104 along the length of the coaxial cable 216. The ferrite elements 220 may prevent EM signals travelling along the coaxial cable 216 from travelling in other directions (e.g., radially outward from the direction illustrated the axis A, substantially perpendicular to the axis A, etc.), thereby preventing EM signals traveling along the coaxial cable 216 from being transmitted to, received by, or otherwise negatively impacting the EM performance of the second antenna 112. The ferrite elements 220 may also prevent EM signals in the area around the coaxial cable 216 from negatively impacting the EM signals transmitted or received by the first antenna 108 via the coaxial cable 216. In contrast, conventional gooseneck devices use a metal interior structure to position an antenna coupled to the gooseneck device away from other antennas. This metal structure may conduct EM signals, thereby causing interference with signals transmitted and/or received by other nearby antennas. Accordingly, the gooseneck device 200 may reduce an amount of EM interaction between the first antenna 108 and the second antenna 112 relative to an amount of EM interaction between an antenna coupled to a conventional metallic gooseneck that does not include ferrite elements, and other nearby antennas.

The flexible elements 224 may be positioned along the coaxial cable 216 adjacent to the ferrite elements 220. The flexible elements 224 may comprise at least one of non-metallic, non-conductive, compliant materials, or a combination thereof. In the example illustrated in FIGS. 3-4, the gooseneck device 200 may comprise three flexible elements 224 positioned between adjacent ferrite elements 220. In other aspects of the disclosure, the gooseneck device 200 may include more or fewer flexible elements 224. The flexible elements 224 may comprise a variety of shapes, such as o-rings (FIGS. 2-4, 6), spheres (FIG. 5), or portions of an overmold material that extend between adjacent ferrite elements 220. Positioning the flexible elements 224 between adjacent ferrite elements 220 may allow the coaxial cable 216 to bend proximate to the flexible elements 224, thereby providing flexibility to the gooseneck device 200. Accordingly, the shape and/or dimensions of the ferrite elements 220 and the flexible elements 224 may be selected to provide a desired amount or range of amounts of flexibility to the gooseneck device 200.

Figure 5:
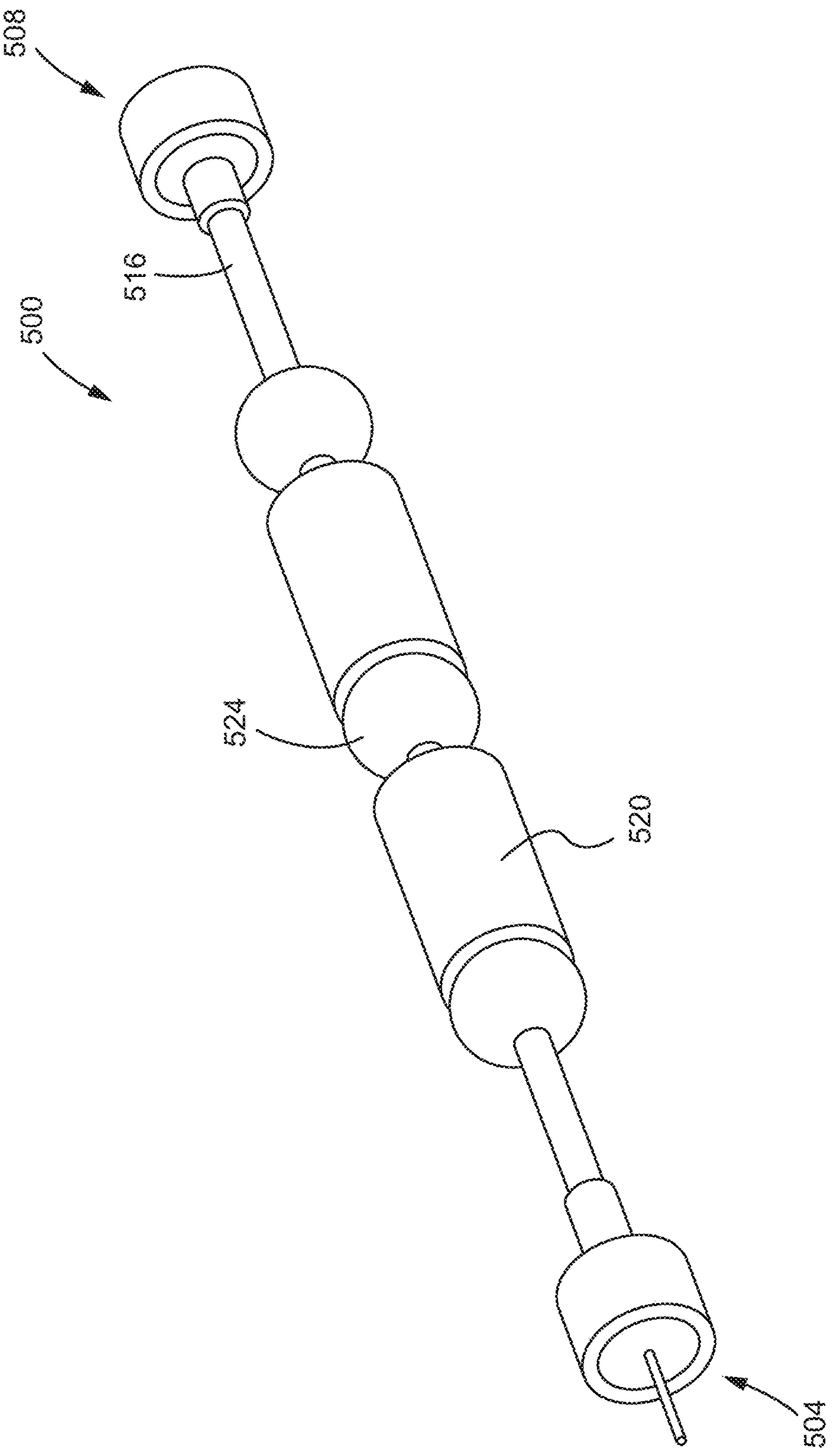
FIG. 5 illustrates a perspective view of another example gooseneck device for the assembled device of FIG. 1, according to another aspect of the present disclosure.

FIG. 5 illustrates a perspective view of an example gooseneck device 500 according to another aspect of the present disclosure. The gooseneck device 500 may generally be similar to the gooseneck device 200. Similar parts are indicated by similar numbers, with the parts of the gooseneck device 500 preceded by the number 5. For the sake of brevity, the gooseneck device 500 is described as it differs from the gooseneck device 200. The overmolded material is not shown in FIG. 5.

As illustrated in FIG. 5, the gooseneck device 500 may include two ferrite elements 520 and three flexible elements 524. The ferrite elements 520 may be substantially tubular and together may cover at least 70% of a length of the coaxial cable 516. The flexible elements 524 may be spherical.

Figure 6:
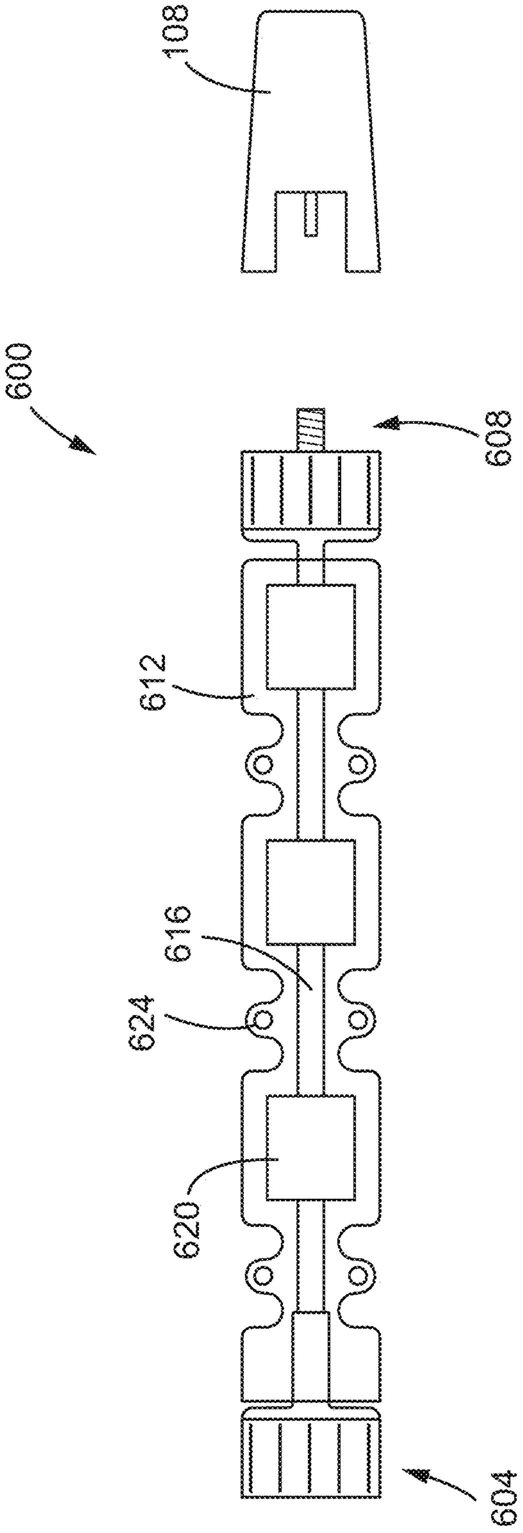
FIG. 6 illustrates a perspective view of another example gooseneck device for the assembled device of FIG. 1, according to another aspect of the present disclosure.

FIG. 6 illustrates a perspective view of an example gooseneck device 600 with an over-molded material 612 partially removed, according to another aspect of the present disclosure. The gooseneck device 600 may be generally similar to the gooseneck device 200. Similar parts are indicated by similar numbers, with the parts of the gooseneck device 600 preceded by the number 6. For the sake of brevity, the gooseneck device 600 is described as it differs from the gooseneck device 200.

As illustrated in FIG. 6, the gooseneck device 600 may include three ferrite elements 620 and three flexible elements 624. The ferrite elements 620 may be substantially tubular. The flexible elements 624 may be o-rings. In the example illustrated in FIG. 6, the first antenna 108 may be removably coupled to the gooseneck device 600. For example, the first antenna 108 may be attached to the gooseneck device 600 and then subsequently removed from the gooseneck device 200.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A feedline gooseneck device for a communication system comprising:

a first port configured to engage a mobile device;

a second port configured to engage a first antenna from a plurality of antennas;

a coaxial cable coupled between the first port and the second port; and a ferrite element integratably positioned about at least a flexible portion of the gooseneck device and positioned along the coaxial cable;

wherein the ferrite element is configured to reduce electromagnetic (EM) interaction among the plurality of antennas.

2. The feedline gooseneck device of claim 1, further comprising the first antenna and the first antenna configured to send and receive EM signals on a first channel and the plurality of antennas is configured to send and receive EM signals on a plurality of channels different than the first channel.

3. The feedline gooseneck device of claim 1, wherein the first antenna is integrally formed with the second port.

4. The feedline gooseneck device of claim 1, wherein the ferrite element is one of a plurality of ferrite elements positioned along the coaxial cable; and further comprising:

a plurality of flexible elements positioned adjacent to each of the plurality of ferrite elements.

5. The feedline gooseneck device of claim 4, wherein each of the plurality of flexible elements include at least one of a non-metallic, a non-conductive, and a compliant material.

6. The feedline gooseneck device of claim 4, wherein each of the plurality of flexible elements is an o-ring.

7. The feedline gooseneck device of claim 4, wherein the plurality of ferrite elements surrounds at least 60% of a length of the coaxial cable.

8. The feedline gooseneck device of claim 4, wherein the plurality of ferrite elements surrounds at least 70% of a length of the coaxial cable.

9. The feedline gooseneck device of claim 4, wherein the plurality of ferrite elements surrounds at least 75% of a length of the coaxial cable.

10. The feedline gooseneck device of claim 4, wherein the plurality of ferrite elements surrounds at least 85% of a length of the coaxial cable.

11. The feedline gooseneck device of claim 4, wherein the plurality of ferrite elements surrounds at least 90% of a length of the coaxial cable.

12. The feedline gooseneck device of claim 4, wherein the plurality of ferrite elements surrounds at least 95% of a length of the coaxial cable.

13. The feedline gooseneck device of claim 4, wherein each of the plurality of ferrite elements is substantially tubular.

14. The feedline gooseneck device of claim 4, wherein each of the plurality of ferrite elements is spherical.

15. The feedline gooseneck device of claim 1, wherein an overmolded material covers at least a portion of the ferrite element, a portion of the co-axial cable, or a portion of the ferrite element and the co-axial cable.

16. The feedline gooseneck device of claim 15, wherein the overmolded material includes a water-impermeable, non-metallic material.

17. The feedline gooseneck device of claim 1, wherein the ferrite element is configured to allow EM signals to travel along the coaxial cable and to prevent EM signals from travelling radially outward from the coaxial cable.

18. The feedline gooseneck device of claim 1, wherein the first antenna is removably coupled to the gooseneck device.

19. The feedline gooseneck device of claim 1, wherein the first port is configured to engage a mobile device via a threaded connector.

20. The feedline gooseneck device of claim 1, wherein the first port is configured to engage a mobile device via a system of snap engaging features.

* * * * *